United States Patent [19]

Ishikawa

[11] Patent Number: 4,823,164
[45] Date of Patent: Apr. 18, 1989

[54] IMAGE FORMING APPARATUS

[76] Inventors: Masahiro, Ishikawa 13-23, Akashicho, Hiratsuka-Shi, Kanagawa 254; Shigeru, Suzuki 440, Moro-okacho, Kohoku-Ku, Yokohama-Shi, Kanagawa 222, both of Japan

[21] Appl. No.: 107,591
[22] PCT Filed: Jan. 12, 1987
[86] PCT No.: PCT/JP87/00017
   § 371 Date: Nov. 9, 1987
   § 102(e) Date: Nov. 9, 1987
[87] PCT Pub. No.: WO87/04269
   PCT Pub. Date: Jul. 16, 1987

[30] Foreign Application Priority Data
   Jan. 14, 1986 [JP] Japan ............................ 61-2608

[51] Int. Cl.$^4$ .................. G03B 27/58; G03B 17/26
[52] U.S. Cl. ......................... 355/72; 354/281; 354/283
[58] Field of Search ................. 355/72, 27, 53; 354/275, 276, 281, 283

[56] References Cited

U.S. PATENT DOCUMENTS

| 3,724,352 | 4/1973 | Shimomura | 354/281 |
| 3,903,532 | 9/1975 | Harrison | 355/53 X |
| 4,697,902 | 10/1987 | Maehara et al. | 354/281 |

FOREIGN PATENT DOCUMENTS 683763 12/1952 United Kingdom .

*Primary Examiner*—Richard A. Wintercorn
*Attorney, Agent, or Firm*—David R. Thornton

[57] ABSTRACT

An image forming apparatus is arranged to comprise a removable film pack holder at a predetermined position of a main body of the image forming apparatus, wherein a film of the film pack loaded in said holder is exposed to an image of an original in the state in which a light shield plate for preventing sensitization is withdrawn, characterized in that there are provided on the main body of the image forming apparatus lock means for preventing removal of said film pack holder, the lock means being locked in the state in which said light shield plate is withdrawn, and lock releasing means for releasing the lock means from the locked state in linkage with insertion of the light shield plate into the film pack holder, thereby preventing the film pack holder from being removed in the state where the light shield plate is withdrawn.

5 Claims, 6 Drawing Sheets

IMAGE FORMING APPARATUS

TECHNICAL FIELD

The present invention relates to an image forming apparatus for forming an image of an original on a diapositive for projection.

BACKGROUND ART

In various lecture meetings, scientific publication assemblies and others, charts, photographs and the like are projected as enlarged onto a screen by using a slide projector and an overhead projector as a means for aiding explanation.

Figure 2:
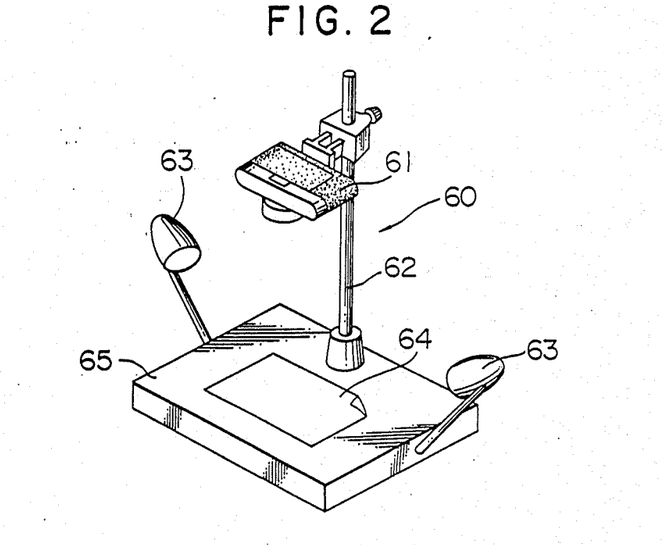
FIG. 2 is a perspective view showing an example of the hitherto known apparatus for preparing a diapositive for projection.

For preparation of a slide from an original, it has heretofore been a common practice that a 35-mm camera 61 is fixedly mounted on a supporting column 62 of a two-piece stand 60 in a disposition facing downwardly, as is shown in FIG. 2, wherein an original 64 disposed on a table plate 65 of the two-piece stand with the surface carrying an image facing upwardly is illuminated with a light source 63 such as a projection lamp or stroboscopic flash lamp and the image is taken by operating a shutter of the camera 61. In that case, operator has to adjust the height of the camera 61 mounted on the supporting column 62 in dependence on the size of the original 64, adjust the focus and determine the shutter speed, aperture value in consideration of the type of the original, the type of the light source and brightness. This procedure requires skillfulness, and it has been difficult to obtain a slide which can be used satisfactorily unless the operator is accustomed to handle the camera.

On the other hand, a diapositive for projection by an overhead projector has heretofore been prepared by coping an original image onto a transparent sheet by using an electro-photographic copying machine. With this procedure, however, only the image in black and white can be obtained. In recent years, color image enjoys higher popularity in the CRT display for a computer or the like, not to speak of television and photograph. The projected image in black and white is poor in impression.

Recently, a variety of instant slide films have been proposed which allow color slides to be prepared immediately after photographing by simplifying the development process. A color instant film pack suited for the application mentioned above is commercially available which allows a color diapositive for the overhead projector to be prepared in a simplified manner. However, for using this film pack, an expensive camera destined for use only with this film pack is necessary. Besides, troublesome procedure is required as in the case of the aforementioned photographing procedure for the preparation of slide by copying the original.

In view of the shortcomings of the hitherto known method of preparing the 35-mm slide and the color diapositive for the overhead projector by copying the original as described above, the inventor of the present invention has devised an image forming apparatus which is simple in manipulation as in the case of the copying machine and in which the 35-mm slide film as well as the diapositive for the overhead projector using the instant film pack can be easily prepared from the original.

In this image forming apparatus, a contact glass plate for supporting thereon an original is provided on a top plate of the main body of the apparatus, wherein light reflected from the original illuminated by an original illuminating light source over the whole surface thereof is focused through a focusing optical system having two exchangeable optical paths onto a 35-mm roll film or a film in a film pack loaded in a 35-mm film loading section and an instant film pack holder, respectively, which are provided in a casing of the main body of the apparatus to thereby effectuate exposure to light.

The instant film pack holder can be removably placed to a predetermined set position on the main body of the image forming apparatus, wherein after setting the holder at the predetermined position, a portion of the film of the film pack loaded in the holder which portion is located at an aperture for exposure is exposed to an original image in the state where a light shield plate for preventing sensitization of the film is pulled out.

For the purpose of mounting a monitor provided with a focusing glass in place of the film pack holder for monitoring the image position or the like when unused film remains within the film pack or for other purposes, necessity often arises for removing the film pack holder from the predetermined set position by moving it along the guide rail. In that case, if the holder should be removed in the state in which the light shield plate has been pulled out, the unused film is sensitized wastefully.

In view of the state of the art described above, it is an object of the present invention to provide an image forming apparatus which is so arranged that erroneous operation of removing the film pack holder in the state in which the light shield plate has been pulled out can be prevented without fail.

DISCLOSURE OF THE INVENTION

With a view to accomplishing the object mentioned above, the present invention is characterized in that there are provided on the main body of the image forming apparatus lock means for preventing removal of the film pack holder, the lock means being locked in the state where the light shield plate has been pulled out, and lock releasing means for releasing the lock means from the locked state in linkage with insertion of the light shield plate into the film pack holder for shielding the film surface from light.

BEST MODES FOR CARRYING OUT THE INVENTION

In the following, an exemplary embodiment of the present invention will be described in detail by referring to the drawings.

Figure 1:
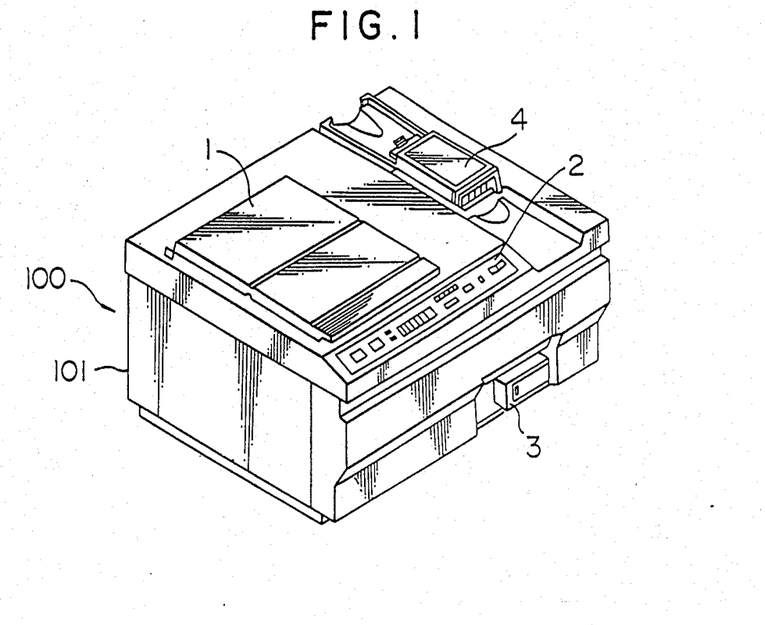
FIG. 1 is a perspective view showing an outer appearance of an embodiment of the present invention.
Figure 3:
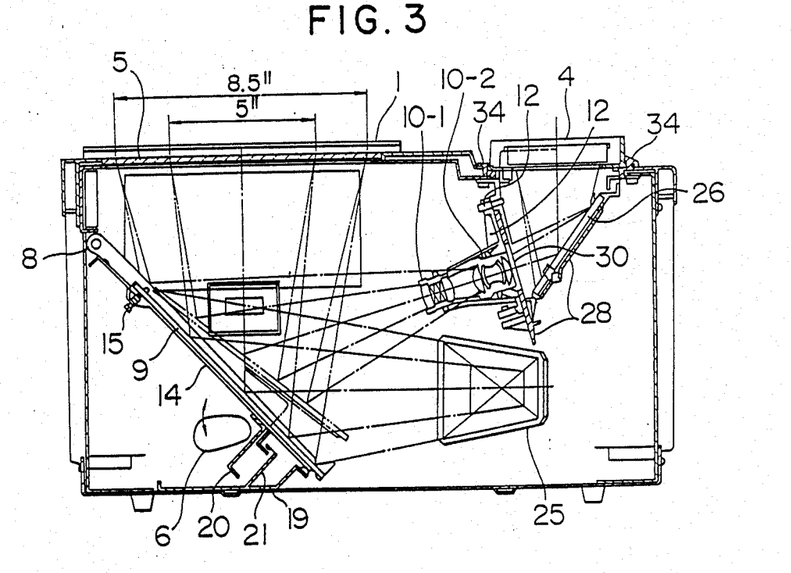
FIGS. 3 and 4 are sectional views of the embodiment shown in FIGS. 3 and 4 as viewed from the front and the lateral side, respectively.
Figure 4:
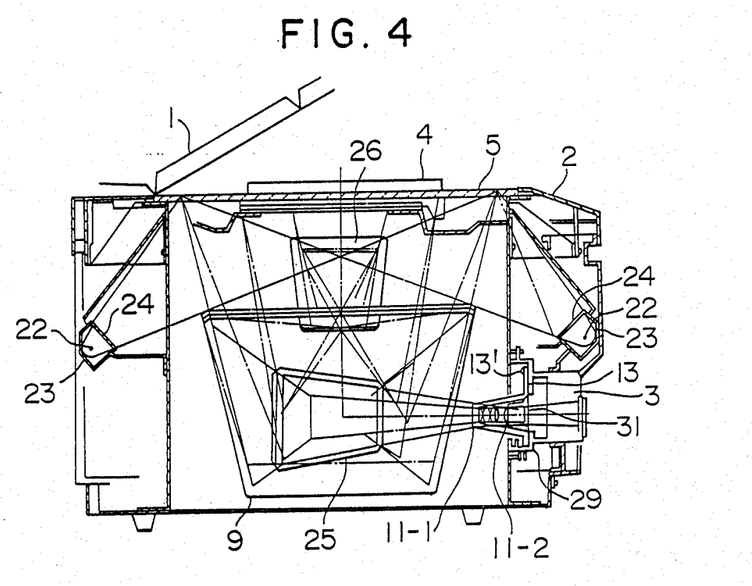

FIG. 1 is a perspective view showing an outer appearance of the image forming apparatus according to an exemplary embodiment of the present invention, and FIGS. 3 and 4 are sectional views of the same as viewed from the front and the left side, respectively.

A main body 100 of the apparatus is formed as an obscura box in which a contact glass plate 5 for supporting an original disposed thereon is provided on a top plate of the casing of the obscura, while an original pressing plate 1 for holding down the original disposed on the contact glass plate is pivotally mounted on a casing ceiling plate at the rear end of the original pressing plate 1. A manipulation portion 2 is provided in front of the contact glass plate 5. A 35-mm film loading portion 3 is provided in a front wall of the casing 101, while a holder 4 for an instant film pack is removably installed on the top plate of the casing 101 at the right side to the contact glass plate 5.

The original disposed on the contact glass plate 5 is illuminated over the whole surface by means of two flash lamps 22 provided on the front side and rear side below the contact glass plate 5, as is shown in FIG. 4. For assuring uniform illumination over the original surface, the flash lamp 22 is provided with a reflector plate 23 and a collecting and diffusing filter (stepped concave or convex lens such as Fresnel lens) 24.

Disposed between the contact glass plate 5 on one hand and a 35-mm film and a film within a film pack on the other hand is a focusing optical system having exchangeable optical paths for focusing reflected light from the original illuminated by the flash lamps 22 selectively onto either the 35-mm film loaded in the aforementioned 35-mm film loading portion or the film within the film pack loaded in the instant film pack holder 4. Referring to FIG. 3, this optical system includes a first mirror 9 which is swingable at the upper end thereof about a supporting stud 8 between a position shown in a solid line and a position shown in a broken line, a second mirror 25 disposed in the optical path of the light reflected from the original when the first mirror 9 is located at the solid line position, lenses 11-1 and 11-2 disposed in the optical path (shown in FIG. 4) for the light reflected by the second mirror 25 for focusing the image on a surface of the 35-mm film, and lenses 10-1 and 10-2 and a third mirror 26 disposed in the optical path for the reflection light shown in a broken line in FIG. 3 for focusing the image onto the film within the film pack when the first mirror 9 is at the position indicated by the broken line.

In the apparatus according to this embodiment, there can be used two types of originals having sizes of 8.5"×11" (215.9 mm×279.4 mm) and 5"×7" (127 mm×177.8 mm) (approximating to a B6 size, a 4×6 size and a cabinet size in a 2L-size color print). For focusing the image of the original fully over the 35-mm film and the film of the instant film pack, respectively, there are provided so as to be exchangeably inserted in the respective optical paths the two pairs of lenses 10-1, 10-2 and 11-1, 11-2 having respective focal lengths differing from each other in the two optical paths.

Figure 5:
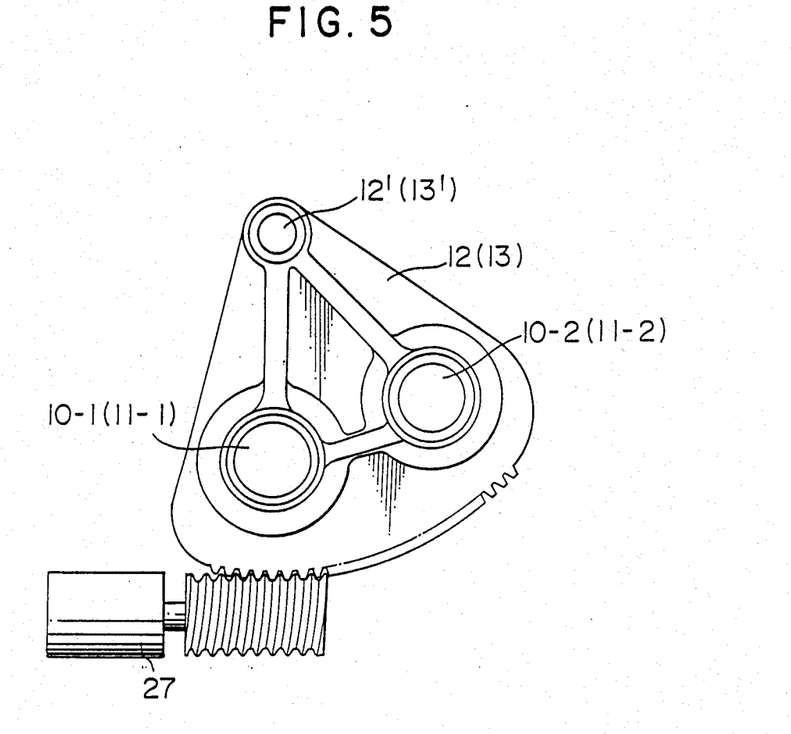
FIG. 5 is a front view showing an example of means for exchanging focusing lenses in dependence on sizes of originals.

Referring to FIG. 5 which is a view showing an example of a lens changing-over apparatus, the lenses 10-1, 10-2 and 11-1, 11-2 are mounted on turrets 12 and 13 having a sector-like shape and rotatable about shafts 12' or 13', respectively, wherein each turret has a worm gear formed in an arcuate portion and meshing with a worm rotated by a motor 27. Thus, by rotating the motor 27 in either one of the directions, either the lenses 10-1, 10-2 or 11-1, 11-2 are selectively inserted in the optical path. For indexing the angular position of the turrets 12, 13, a stopper (not shown) is provided adjustably in respect to the position. Further, each lens is so mounted on the associated turret as to be finely adjustable in the direction coinciding with the optical path and thus can be adjusted to focus the image on the film with accuracy.

The turrets 12, 13 are moved slidably in contact with light shield members 28, 29 for protecting the film from exposure to light. Further, shutters 30 and 31 are installed, respectively, in the optical paths on the side of the turrets facing the films. The shutter 30, 31 is so controlled that upon actuation of a start switch provided in the manipulating portion 2, the flash lamps 22 are fired after the shutter has been opened completely, the shutter beginning to be closed upon completion of the flashing, as in the case of operation of the shutter at the time of flashing of the strobo lamp in the photographic camera.

Figure 6:
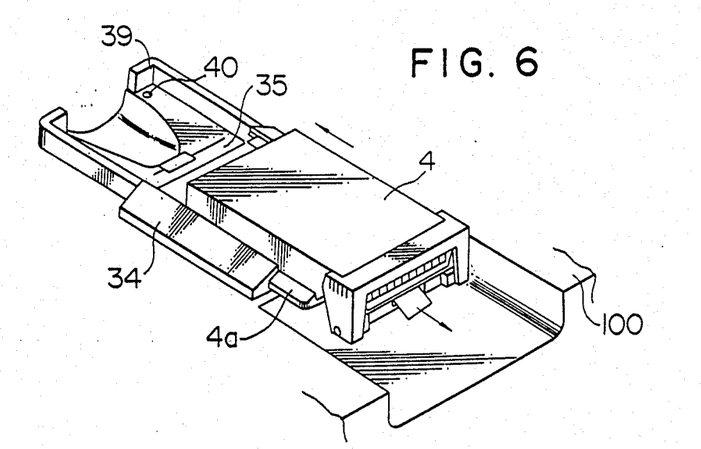
FIG. 6 is a perspective view of a film pack holder mounting portion of the apparatus according to the embodiment, FIG. 7($a$) is a plan view of the same, FIG. 7($b$) is a plan view showing a film pack holder releasing and locking mechanism.
Figure 7A:
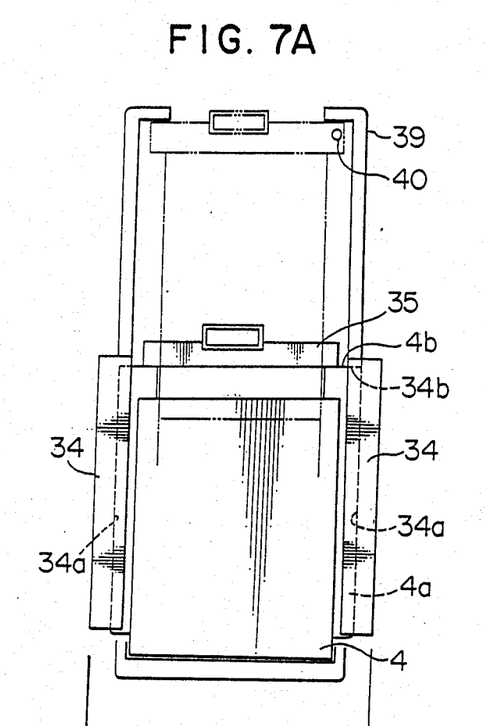

Next, structure of the mounting portion for the instant film pack holder 4 will be described by referring to FIG. 6 and FIGS. 7(a) and 7(b).

A pair of rail members 34 extending forwardly and rearwardly are fixedly mounted on the main body of the apparatus in the instant film pack holder mounting portion provided laterally of the contact glass plate on the top plate of the main body 100 of the image forming apparatus. Formed in the surfaces of these rails 34 facing in opposition to each other are grooves 34a in which flanges 4a provided at both sides of the holder 4 can be slidably inserted. By inserting the flanges 4a of the holder 4 in the grooves of the rails 34 from the front side until leading ends 4b of the flanges 4a abut against end faces 34b of the grooves, the holder 4 is positioned at a predetermined set position. A sensor not shown is provided in the vicinity of the rail member 34 for detecting that the holder 4 has been set at the predetermined position.

A light shield plate 35 for preventing the unused film within the instant film pack mounted on the holder from being exposed to light is so provided that the plate 35 can be pulled out forwardly in the direction in which the light shield plate 5 has been inserted. In FIG. 7(a), the light shield plate 35 is shown in the shielding state by a solid line, while the state in which the plate 35 is pulled out for allowing the exposure is indicated by a broken line. A reference numeral 39 denotes a fence for preventing the light shield plate from being completely disengaged from the holder 4 upon pulling out the light shield plate 35 from the holder and additionally serving as a stopper assuring the withdrawal of the light shield plate to the position at which the aperture is completely opened for allowing the film surface to be exposed to the light image. A sensor 40 is provided in the vicinity of the fence 39 for detecting that the light shield plate 35 has been withdrawn to the predetermined position. Unless the light shield plate 35 is detected by the sensor 40, the copying operation is rendered impossible. This sensor may be realized by using known various types of sensors such as optical sensors, microswitches and the like.

The mounting portion for the instant film pack holder 4 is provided with a holder locking mechanism according to the present utility model. As is shown in FIG. 7(b), the lock mechanism is implemented in the form of a lever 37 supported rotatably at a middle portion thereof on a pin 37' anchored in the machine frame of the main body of the apparatus and biased by a spring 38 provided at the rear end portion so as to be rotated in the direction indicated by an arrow B, the lever 37 having a hook-like claw 37-1 provided at the front end portion and adapted to be retained on the front end face of the flange 4a provided at the side wall of the holder 4. As an interlocking means for engaging and disengaging the lever 37 in linkage with the movement of the light shield plate 35, there is provided a lever 36 supported rotatably at a middle portion thereof on a pin 36' anchored in the machine frame and having a front end portion adapted to engage with an outer side face of the rear end portion of the aforementioned lever 37, the lever 36 further having a cam 36a fixedly secured on the inner side of the rear end portion adapted to engage with a projection projecting laterally from the light shield plate 35 at the leading end thereof in the light shield position of the light shield plate 35.

Figure 7B:
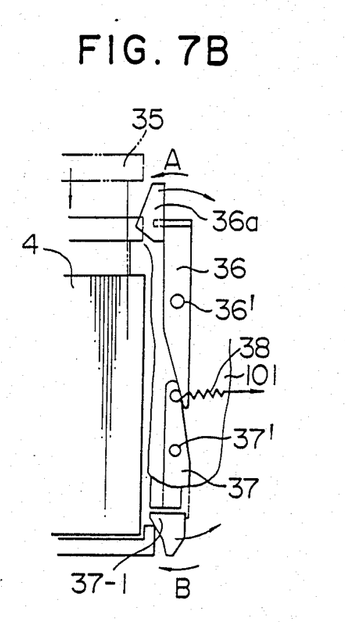

Accordingly, in the state where the instant film pack holder 4 is not mounted, the cam fixedly secured to the lever 36 at the rear end portion is free from any contact, as the result of which the lever 36 can be rotated in the counterclockwise direction under the influence of the spring 38, while the lever 37 occupies the position shown in FIG. 7(b) after having been rotated in the clockwise direction (the direction indicated by the arrow B).

For mounting the holder 4 in the mounting portion in the above-mentioned state, the flanges 4a are pushed into the grooves 34a of the rail 34 in the direction for insertion. Then, the outer inclined surface of the claw 37-1 of the lever 37 is pressed by the corner angle portion of the flange 4a, whereby the lever 37 is rotated by a certain angle in the counterclockwise direction against the force exerted by the spring 38. In this state, the holder 4 is inserted with the leading end 4b of the flange 4a bearing against the rear end wall 34b of the flange 4a, whereby the holder 4 is positioned at the set position. In this state, the claw 37-1 of the lever 37 can be retained by the rear end of the flange 4a of the holder 4. However, the lateral projection formed at the leading end portion of the light shield plate 35 of the holder 4 comes to engagement with the cam 36a of the lever 36 to thereby press the end portion of the lever 36 where the cam 36a is formed. Consequently, the lever 37 is held against the force of the spring 38 in the state in which the end portion of the flange 4a of the holder 4 is disengaged from the claw 37-1.

When the light shield plate 45 is withdrawn in the state in which the holder 4 is held at the afore-mentioned set position, the lateral projection formed at the leading end portion of the light shield plate is released from engagement with the cam 36a of the lever 36, as is shown in FIG. 7(b), resulting in that the lever 36 and the lever 37 occupy the positions shown in FIG. 7(b) with the claw 37-1 of the lever 37 engaging with the end portion of the flange 4 of the holder 4.

In this manner, it is impossible to remove completely the holder 4 in the state where the light shield plate 35 has been withdrawn to a certain extent from the holder 4.

However, when the light shield plate 35 is inserted to the light shield position as indicated by the arrow in FIG. 7(b), the cam 36a of the lever 36 comes to engagement with the lateral projection formed at the leading end of the light shield plate 35 and is pressed outwardly. As the result, the claw 37-1 of the lever 37 is disengaged from the end portion of the flange 4a of the holder 4. Thus, the holder can be removed.

In the foregoing, description has been made of the exemplary embodiment of the present utility model applied to the apparatus in which the film pack holder is adapted to be removably mounted on the main body of the image forming apparatus by sliding the holder along the guide rails fixedly secured to the main body of the apparatus. However, the present utility model can also be applied to an apparatus which differs from the one described above in respect to the means for mounting and removing the film pack holder on and from the main body of the apparatus.

Figure 8:
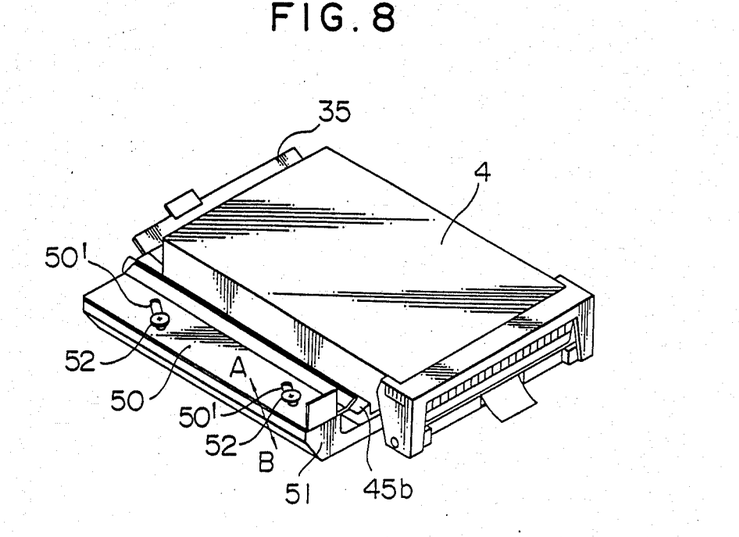
FIG. 8 is a perspective view showing another exemplary embodiment of the present invention.
Figure 9:
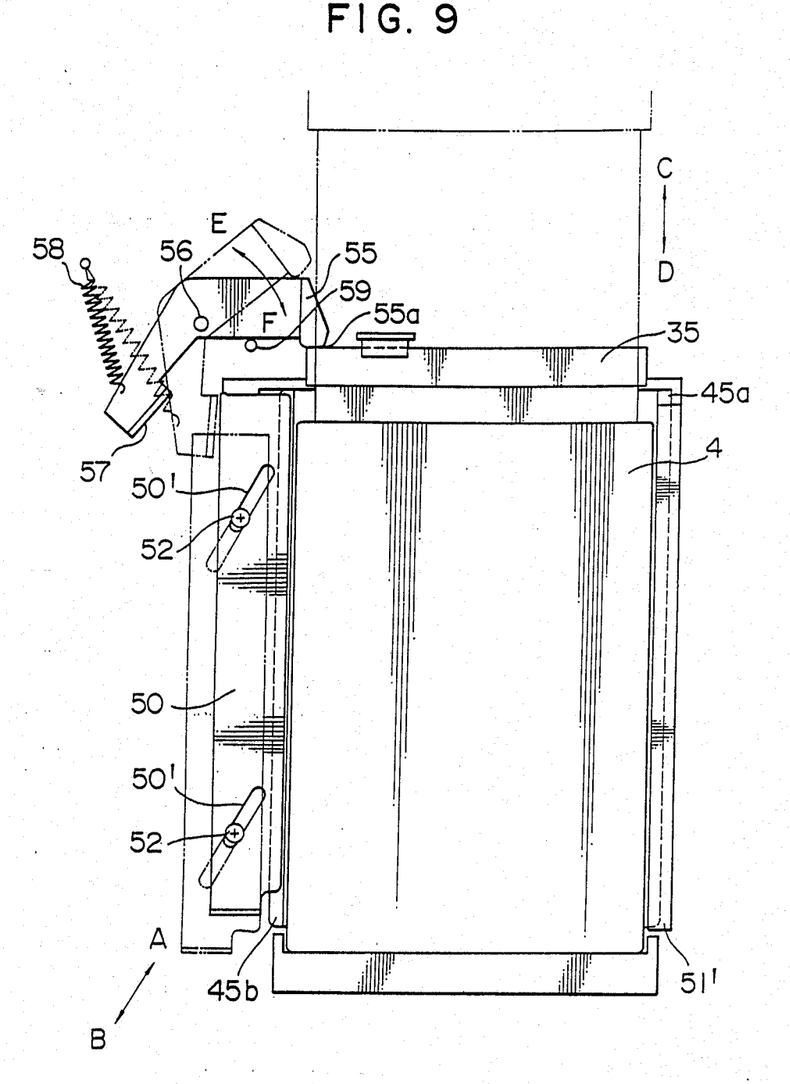
FIG. 9 is a plan view of the same and FIG. 10 is a front view of the same.
Figure 10:
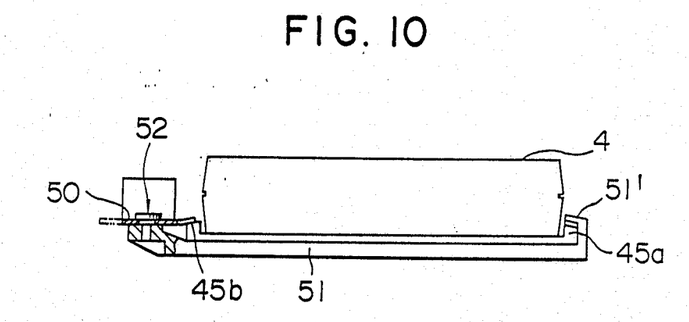

Next, by referring to FIGS. 8 to 10, description will be made on an exemplary embodiment of the present invention applied to an apparatus in which the film pack holder is caused to bear on a holding base of the film pack holder by engaging a shoulder portion formed in one lateral edge of the instant film pack holder in a mating groove of a claw-like form provided in the holding base, while a shoulder portion of the other lateral edge is held down by fixing means provided in association with the holding base, to thereby mount the film pack holder on the main body of the apparatus, wherein the holder can be removed upwardly from the main body of the apparatus by releasing the fixing means.

In the case of the instant embodiment, the right shoulder portion 4 of the film pack holder as viewed in the figure is engaged with a claw portion 51' formed in the right lateral edge of the base 51 over the whole length thereof, which base 51 is fixedly secured to the top surface of the image forming apparatus. Subsequently, the holder 4 is lowered from above until the bottom surface of the holder is brought to contact with the top surface of the base 51. Then, a fixing plate 50 having elongated slots 50' which extend obliquely and in which screws 52 having respective offset portions and anchored in the base 51 at two locations near the left edge thereof are slidably engaged is slid in the direction indicated by an arrow A in the drawing, to thereby cause the fixing plate 50 to engage with the upper surface of the left shoulder portion 45b of the holder 4. The holder is then pressed downwardly to be thereby positioned in place and securely mounted.

When the holder 4 is to be removed, the fixing plate 50 is slid in the direction indicated by an arrow B to be retract from the left shoulder portion 45b of the holder 4. Subsequently, the holder 4 is lifted up at the left side thereof while disengaging the right shoulder portion 45a from the claw portion 51'. Thus, the holder 4 can be removed upwardly.

A lever 55 is pivotally supported on a pin 56 anchored in the main body of the apparatus at a position rearward of the rear end of the base 51 and slightly outward of the left end edge thereof, wherein the aforementioned lever 55 is urged to rotate in the direction indicated by an arrow F under the force of a spring 58 suspended under tension between the lever and the machine frame, while the lateral edge of the lever remote from the pivot pin bears against a pin 59 anchored in the vicinity of the line coinciding with the rear end of the closed light shield plate 35, whereby the rotation of the lever is limited. A tip end 55a of the arm of the lever 55 which bears against the pin 59 abuts against the rear end of the closed light shield plate 45 in the state in which the lever 55 bears against the pin 59.

A stopper portion 57 is provided in the lever 55 at the other end portion to be engageable with the left side edge of the fixing plate 50. In the state in which the lever 55 bears against the pin 59, the lever is spaced from the outer side edge of the fixing plate when the fixing plate 50 has been moved to the outermost position. Upon pulling out the light shield plate 35 in the direction indicated by an arrow C. The tip end 55a of the lever 55 is pushed by the end edge of the light shield plate 35 to be brought to slidable contact with the lateral edge of the light shield plate 35. In this state, the lever 55 occupies the position indicated by a broken line in the figure, and the stopper portion 57 is forced to bear against the outer side edge of the fixing plate 50 which is positioned to push the left shoulder portion of the pack holder 4.

Thus, when the light shield plate 35 is pulled out from the film pack loaded in the pack holder mounted on the image forming apparatus, the lever 55 is rotated to a position indicated by a broken line in the figure in the direction indicated by an arrow E, while the fixing plate 50 is inhibited from moving in the direction indicated by an arrow B due to the stopper portion 57, making it impossible to dismount the holder 4. However, when the light shield plate 35 is moved in the direction indicated by an arrow D to the closed position, the lever 55 is rotated in the direction indicated by an arrow F with the stopper portion 57 being retracted from the fixing plate 53 which then can be moved in the direction indicated by the arrow B, as the result of which the holder 4 can be removed.

INDUSTRIAL APPLICABILITY

With the structure described above, the instant film pack holder is prevented from being removed from the set position in the state where the light shield plate is at the open position. Thus, there can be realized protection against the wastefulness due to exposure of unused film which will occur if the holder is removed with the light shield plate remaining in the open state.

It should be mentioned that the present invention can be applied not only to the image forming apparatus in which the optical path of light reflected by the original can be changed over between the 35-mm film and the film within the instant film pack holder according to the illustrated embodiment but also to such an image forming apparatus in which the image of the original is focused onto only the film within the instant film pack holder.

We claim:

1. An image forming apparatus having a mounting arrangement for releasably receiving a film holder in position for exposing film carried by the film holder when a light shield of the film holder is withdrawn from a light shielding position toward an open position, and lock means for preventing removal of the film holder from the mounting arrangement when the light shield is in other than its light shielding position, the improvement wherein the lock means comprises a lever arrangement mounted on said apparatus in cooperative association with the light shield of a mounted film holder for pivotal movement of a portion of said lever arrangement into the path of removal of the film holder responsive to withdrawal of the light shield from its light shielding position.

2. An image forming apparatus having a mounting arrangement for releasably receiving a film holder in position for exposing film carried by the film holder when a light shield is withdrawn at one end of the film holder from a light shielding position, the light shield having a lateral projection at its leading end as viewed in the direction of withdrawal, and the mounting arrangement being configured for receiving the film holder by leading insertion of the one end thereof in one end of the mounting arrangement and subsequent sliding of the one end of the film holder to the other end of the mounting arrangement, and lock means for preventing removal of the film holder from the mounting arrangement when the light shield is in other than its light shielding position, the improvement wherein the lock means includes a pair of pivotally mounted levers extending along side the mounting arrangement into engagement of their distal ends with each other, a first of said levers carrying a claw arrangement extending at the one end of the mounting arrangement for displacement into the path of insertion and removal of the film holder when the distal end of said first lever is urged away from the mounting arrangement, a spring arrangement for urging the distal end of said first lever away from the mounting arrangement so as to pivotally urge said claw arrangement into the path of the film holder to prevent its removal, and the second of said levers carrying a cam extending at the other end of the mounting arrangement into engagement with the lateral projection of the light shield when the light shield is in its light shielding position, and said second lever being pivotally mounted alongside the mounting arrangement with its distal end in engagement with the distal end of said first lever to urge the distal end of said first lever toward the mounting arrangement responsive to engagement of said cam with the lateral projection of the light shield so as to pivot said claw out of the path of insertion of the film holder, and when the light shield is withdrawn, to allow said first lever under the urging of said spring arrangement to pivot its claw into the path of insertion of the film holder.

3. The improvement of claim 2 wherein said claw includes an inclined surface configured to engage the leading end of the film holder during its insertion so as to pivot said claw out of the path of insertion.

4. An image forming apparatus having a mounting arrangement for releasably receiving a film holder in position for exposing film carried by the film holder when a light shield of the film holder is withdrawn from a light shielding position toward an open position, and lock means for preventing removal of the film holder from the mounting arrangement when the light shield is withdrawn, the improvement wherein the mounting arrangement includes a rail member for receiving one side of the film holder and a fixing plate laterally displaceable between a release position remote from the other side of the film holder and a clamp position in engagement with such other side of the film holder, and the lock means comprises a lever pivotally mounted at one end of the mounting arrangement from which the light shield of the film holder is withdrawn, said lever having a tip end adjoining said one end of said mounting arrangement and a stop end adjoining said fixing plate, a spring arrangement for urging said stop end away from said fixing plate and said tip end into the path of travel of the leading end of the light shield when the light shield is in its light shielding position, and said lever being of a length and configuration such that the light shield when withdrawn engages said tip end of said lever to rotate it against the urging of said spring arrangement so as to bring its said stop end into engagement with said fixing plate to thereby preclude lateral displacement of said fixing plate from its said clamp position to its said release position and prevent removal of the film holder when the light shield is in its open position.

5. The improvement of claim 4 including a stop arranged to limit the pivotal rotation of said lever under the urging of said spring arrangement to a location wherein said tip end just overlies the leading end of the light shield when the shield is in its light shielding position.

* * * * *